United States Patent
Huppenthal et al.

(10) Patent No.: US 7,565,461 B2
(45) Date of Patent: Jul. 21, 2009

(54) SWITCH/NETWORK ADAPTER PORT COUPLING A RECONFIGURABLE PROCESSING ELEMENT TO ONE OR MORE MICROPROCESSORS FOR USE WITH INTERLEAVED MEMORY CONTROLLERS

(75) Inventors: Jon M. Huppenthal, Colorado Springs, CO (US); Thomas R. Seeman, Colorado Springs, CO (US); Lee A. Burton, Divide, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 243 days.

(21) Appl. No.: 11/203,983

(22) Filed: Aug. 15, 2005

(65) Prior Publication Data

US 2005/0283546 A1 Dec. 22, 2005

Related U.S. Application Data (60) Continuation-in-part of application No. 10/340,390, filed on Jan. 10, 2003, now Pat. No. 7,197,575, which is a continuation-in-part of application No. 09/932,330, filed on Aug. 17, 2001, now Pat. No. 7,373,440, which is a continuation-in-part of application No. 09/755,744, filed on Jan. 5, 2001, now abandoned, which is a division of application No. 09/481,902, filed on Jan. 12, 2000, now Pat. No. 6,247,110, which is a continuation of application No. 08/992,763, filed on Dec. 17, 1997, now Pat. No. 6,076,152.

(60) Provisional application No. 60/422,722, filed on Oct. 31, 2002.

(51) Int. Cl.
*G06F 3/00* (2006.01)
(52) U.S. Cl. .............................. 710/22; 710/2; 710/62; 709/250

(58) Field of Classification Search ....................... None
See application file for complete search history.

(56) References Cited

U.S. PATENT DOCUMENTS 4,763,294 A  8/1988  Fong (Continued)

FOREIGN PATENT DOCUMENTS

| EP | 0 571 099 A | 11/1993 |
| JP | 59-206972 | 11/1984 |
| JP | 63-086079 | 4/1988 |

OTHER PUBLICATIONS

Vemuri, Ranga R. et al., "Configurable Computing: Technology and Applications", Apr. 2000, Computer, pp. 39-40.

(Continued)

*Primary Examiner*—Eron J Sorrell
(74) *Attorney, Agent, or Firm*—William J. Kubida; Michael C. Martensen; Hogan & Hartson LLP (57) ABSTRACT

A switch/network adapter port ("SNAP™") in a dual in-line memory module ("DIMM") or Rambus™ in-line memory module ("RIMM") format for clustered computers employing multi-adaptive processor ("MAP®", both trademarks of SRC Computers, Inc.) elements for use with interleaved memory controllers. Particularly disclosed is a microprocessor based computer system utilizing either a DIMM or RIMM physical format adapter port coupled to a reconfigurable processor element for the purpose of implementing a connection to an external switch, network, or other device. In a particular embodiment, connections may be provided to either the PCI, accelerated graphics port ("AGP") or system maintenance ("SM") bus for purposes of passing control information to the host microprocessor or other control chips. The field programmable gate array ("FPGA") based processing elements have the capability to alter data passing through it to and from an external interconnect fabric or device.

24 Claims, 11 Drawing Sheets

U.S. PATENT DOCUMENTS

| | | | |
|---|---|---|---|
| 4,783,730 | A | 11/1988 | Fischer |
| 4,972,457 | A | 11/1990 | O'Sullivan |
| 5,230,057 | A | 7/1993 | Shido et al. |
| 5,295,246 | A | 3/1994 | Bischoff et al. |
| 5,509,134 | A | 4/1996 | Fandrich et al. |
| 5,570,040 | A | 10/1996 | Lytle et al. |
| 5,673,204 | A * | 9/1997 | Klingelhofer ............... 348/578 |
| 5,737,766 | A | 4/1998 | Tan |
| 5,802,290 | A | 9/1998 | Casselman |
| 5,857,109 | A | 1/1999 | Taylor |
| 5,889,959 | A | 3/1999 | Whittaker et al. |
| 5,892,962 | A | 4/1999 | Cloutier |
| 5,903,771 | A | 5/1999 | Sgro et al. |
| 5,915,104 | A | 6/1999 | Miller |
| 5,923,682 | A | 7/1999 | Seyyedy et al. |
| 5,953,502 | A | 9/1999 | Helbig, Sr. |
| 5,966,534 | A | 10/1999 | Cooke et al. |
| 6,023,755 | A | 2/2000 | Casselman |
| 6,026,478 | A | 2/2000 | Dowling et al. |
| 6,038,431 | A | 3/2000 | Fukutani et al. |
| 6,047,343 | A | 4/2000 | Olarig et al. |
| 6,052,134 | A | 4/2000 | Foster |
| 6,052,773 | A | 4/2000 | DeHon et al. |
| 6,055,619 | A * | 4/2000 | North et al. ................... 712/36 |
| 6,076,152 | A | 6/2000 | Huppenthal et al. |
| 6,108,730 | A | 8/2000 | Dell et al. |
| 6,148,356 | A | 11/2000 | Archer et al. |
| 6,192,439 | B1 | 2/2001 | Grunewald et al. |
| 6,202,111 | B1 | 3/2001 | Wallach et al. |
| 6,295,571 | B1 | 9/2001 | Scardamalia et al. |
| 6,326,973 | B1 | 12/2001 | Behrbaum et al. |
| 6,426,879 | B1 | 7/2002 | Take |
| 6,446,192 | B1 * | 9/2002 | Narasimhan et al. .......... 712/29 |
| 6,452,700 | B1 | 9/2002 | Mays, Jr. |
| 6,480,014 | B1 | 11/2002 | Li et al. |
| 6,577,621 | B1 | 6/2003 | Balachandran |
| 6,581,157 | B1 | 6/2003 | Chiles et al. |
| 6,598,199 | B2 | 7/2003 | Tetrick |
| 6,633,945 | B1 | 10/2003 | Fu et al. |
| 6,704,816 | B1 | 3/2004 | Burke |
| 6,721,884 | B1 | 4/2004 | De Oliveira Kastrup Pereira et al. |
| 6,799,252 | B1 | 9/2004 | Bauman |
| 6,810,121 | B1 * | 10/2004 | Ikesue ................... 379/399.01 |
| 2004/0030816 | A1 * | 2/2004 | Knight et al. ................. 710/52 |

OTHER PUBLICATIONS

DeHon, Andre, "The Density Advantage of Configurable Computing", Apr. 2000, Computer, pp. 41-49.

Haynes, Simon D. et al., "Video Image Processing with the Sonic Architecture", Apr. 2000, Computer, pp. 50-57.

Platzner, Marco, "Reconfigurable Accelerators for Combinatorial Problems", Apr. 2000, Computer, pp. 58-60.

Callahan, Timothy J. et al., "The Garp Architecture and C Compiler", Apr. 2000, Computer, pp. 62-69.

Goldstein, Seth Copen et al., "PipeRench: A Reconfigurable Architecture and Compiler", Apr. 2000, Computer, pp. 70-76.

Yun, Hyun-Kyu and Silverman, H.F.; "A distributed memory MIMD multi-computer with reconfigurable custom computing capabilities", Brown University, Dec. 10-13, 1997, pp. 7-13.

Agarwal, A., et al., "The Raw Compiler Project", pp. 1-12, http://cag-www.lcs.mit.edu/raw, Proceedings of the Second SUIF Compiler Workshop, Aug. 21-23, 1997.

Albaharna, Osama, et al., "On the viability of FPGA-based integrated coprocessors", © 1996 IEEE, Publ. No. 0-8186-7548-9/96, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", © 1993 Massachusetts Institute of Technology, pp. 88-102.

Bittner, Ray, et al., "Computing kernels implemented with a wormhole RTR CCM", © 1997 IEEE, Publ. No. 0-8186-8159-4/97, pp. 98-105.

Buell, D., et al. "Splash 2: FPGAs in a Custom Computing Machine—Chapter 1—Custom Computing Machines: An Introduction", pp. 1-11, http://www.computer.org/espress/catalog/bp07413/spls-ch1.html (originally believed published in J. of Supercomputing, vol. IX, 1995, pp. 219-230.

Casselman, Steven, "Virtual Computing and The Virtual Computer", © 1993 IEEE, Publ. No. 0-8186-3890-7/93, pp. 43-48.

Chan, Pak, et al., "Architectural tradeoffs in field-programmable-device-based computing systems", © 1993 IEEE, Publ. No. 0-8186-3890-7/93, pp. 152-161.

Clark, David, et al., "Supporting FPGA microprocessors through retargetable software tools", © 1996 IEEE, Publ. No. 0-8186-7548-9/96, pp. 195-103.

Cuccaro, Steven, et al., "The CM-2X: a hybrid CM-2/Xilink prototype", © 1993 IEEE, Publ. No. 0-8186-3890-7/93, pp. 121-130.

Culbertson, W. Bruce, et al., "Exploring architectures for volume visualization on the Teramac custom computer", © 1996 IEEE, Publ. No. 0-8186-7548-9/96, pp. 80-88.

Culbertson, W. Bruce, et al., "Defect tolerance on the Teramac custom computer", © 1997 IEEE, Publ. No. 0-8186-8159-4/97, pp. 116-123.

Dehon, Andre, "DPGA-Coupled microprocessors: commodity IC for the early $21^{st}$ century", © 1994 IEEE, Publ. No. 0-8186-5490-2/94, pp. 31-39.

Dehon, A., et al., "Matrix A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. No. 0-8186-5490-2/94, pp. 72-81.

Elliott, Duncan, et al., "Computational Ram: a memory-SIMD hybrid and its application to DSP", © 1992 IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernard, et al., "Assessing Document Relevance with Run-Time Reconfigurable Machines", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al. "A General Approach in System Design Integrating Reconfigurable Accelerators," http://xputers.informatik.uni-kl.de/papers/paper026-1.html, IEEE 1996 Conference, Austin, TX, Oct. 9-11, 1996.

Hartenstein, Reiner, et al., "A reconfigurable data-driven ALU for Xputers", © 1994 IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1986 IEEE, Publ. No. 0272-1732/86/1000-0006, pp. 6-17.

Herpel, H. -J., et al., "A Reconfigurable Computer for Embedded Control Applications", © 1993 IEEE, Publ. No. 0-8186-3890-7/93, pp. 111-120.

Hogl, H., et al., "Enable++: A second generation FPGA processor", © 1995 IEEE, Publ. No. 0-8186-7086-X/95, pp. 45-53.

King, William, et al., "Using MORRPH in an industrial machine vision system". © 1996 IEEE, Publ. No. 08186-7548-9/96, pp. 18-26.

Manohar, Swaminathan, et al., "A pragmatic approach to systolic design", © 1988 IEEE, Publ. No. CH2603-9/88/0000/0463, pp. 463-472.

Mauduit, Nicolas, et al., "Lneuro 1.0: a piece of hardware LEGO for building neural network systems," 1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "Matrix: A Reconfigurable Computing Architecture with Configurable Instruction Distribution and Deployable Resources", © 1996 IEEE, Publ. No. 0-8186-7548-9/96, pp. 157-166.

Morley, Robert E., Jr., et al., "A Massively Parallel Systolic Array Processor System", © 1988 IEEE, Publ. No. CH2603-9/88/0000/0217, pp. 217-225.

Patterson, David, et al., "A case for intelligent DRAM: IRAM", Hot Chips VIII, Aug. 19-20, 1996, pp. 75-94.

Peterson, Janes, et al., "Scheduling and partitioning ANSI-C programs onto multi-FPGA CCM architectures", © 1996 IEEE, Publ. No. 0-8186-7548-9/96, pp. 178-187.

Schmit, Herman, "Incremental reconfiguration for pipelined applications," © 1997 IEEE, Publ. No. 0-8186-8159-4/97, pp. 47-55.

Sitkoff, Nathan, et al., "Implementing a Genetic Algorithm on a Parallel Custom Computing Machine", Publ. No. 0-8186-7086-X/95, pp. 180-187, published in 1995.

Stone, Harold, "A logic-in-memory computer", © 1970 IEEE, IEEE Transactions on Computers, pp. 73-78, Jan. 1990.

Tangen, Uwe, et al., "A parallel hardware evolvable computer POLYP extended abstract", © 1997 IEEE, Publ. No. 0-8186-8159/4/97, pp. 238-239.

Thornburg, Mike, et al., "Transformable Computers", © 1994 IEEE, Publ. No. 0-8186-5602-6/94, pp. 674-679.

Tomita, Shinji, et al., "A computer low-level parallelism QA-2", © 1986 IEEE, Publ. No. 0-0384-7495/86/0000/0280, pp. 280-289.

Trimberger, Steve, et al., "A time-multiplexed FPGA", © 1997 IEEE, Publ. No. 0-8186-8159-4/97, pp. 22-28.

Ueda, Hirotada, et al., "A multiprocessor system utilizing enhanced DSP's for image processing", © 1988 IEEE, Publ. No. CH2603-9/88/0000/0611, pp. 611-620.

Villasenor, John, et al., "Configurable computing", © 1997 Scientific American, Jun. 1997.

Wang, Quiang, et al., "Automated field-programmable compute accelerator design using partial evaluation", © 1997 IEEE, Publ. No. 0-8186-8159-4/97, pp. 145-154.

W.H. Mangione-Smith and B.L. Hutchings. Configurable computing: The Road Ahead. In Proceedings of the Reconfigurable Architectures Workshop (RAW'97), pp. 81-96, 1997.

Wirthlin, Michael, et al., "The Nano processor: a low resource reconfigurable processor", © 1994 IEEE, Publ. No. 0-8186-5490-2/94, pp. 23-30.

Wirthlin, Michael, et al., "A dynamic instruction set computer", © 1995 IEEE, Publ. No. 0-8186-7086-X/95, pp. 99-107.

Wittig, Ralph, et al., "One Chip: An FPGA processor with reconfigurable logic", © 1996 IEEE, Publ. No. 0-8186-7548-9/96, pp. 126-135.

Yamauchi, Tsukasa, et al., "SOP: A reconfigurable massively parallel system and its control-data flow based compiling method", © 1996 IEEE, Publ. No. 0-8186-7548-9/96, pp. 148-156.

"Information Brief", PCI Bus Technology, © IBM Personal Computer Company, 1997, pp. 1-3.

* cited by examiner

SWITCH/NETWORK ADAPTER PORT COUPLING A RECONFIGURABLE PROCESSING ELEMENT TO ONE OR MORE MICROPROCESSORS FOR USE WITH INTERLEAVED MEMORY CONTROLLERS

CROSS REFERENCE TO RELATED PATENT APPLICATIONS

The present invention is a Continuation-In-Part of U.S. patent application Ser. No. 10/340,390 filed Jan. 10, 2003 now U.S. Pat. No. 7,197,575 for: "Switch/Network Adapter Port Coupling a Reconfigurable Processing Element to One or More Microprocessors for Use with Interleaved Memory Controllers", which is a Continuation-in-Part of U.S. patent application Ser. No. 09/932,330 filed Aug. 17, 2001 now U.S. Pat No. 7,373,440 for: "Switch/Network Adapter Port for Clustered Computers Employing a Chain of Multi-Adaptive Processors in a Dual In-Line Memory Module Format", which is a Continuation-in-Part of U.S. patent application Ser. No. 09/755,744 filed Jan. 5, 2001 for "Multiprocessor computer architecture incorporating a plurality of memory algorithm processors in the memory subsystem", which is a Divisional of U.S. patent application Ser. No. 09/481,902 filed Jan. 12, 2000 (now U.S. Pat. No. 6,247,110) for "Multiprocessor Computer Architecture Incorporating A Plurality Of Memory Algorithm Processors In The Memory Subsystem" which is a Continuation of U. S. patent application Ser. No. 08/992,763 filed Dec. 17, 1997 (now U.S. Pat. No. 6,076,152) for "Multiprocessor Computer Architecture Incorporating A Plurality Of Memory Algorithm Processors In The Memory Subsystem", and also claims priority of U.S. Provisional Patent Application Ser. No 60/422,722filed Oct. 31, 2002 for: "General Purpose Reconfigurable Computing Hardware and Software"all of which are assigned to SRC Computers, Inc., Colorado Springs, Colorado, the disclosures of which are herein specifically incorporated in their entirety by this reference.

BACKGROUND OF THE INVENTION

The present invention relates, in general, to the field of computer systems and methods incorporating one or more reconfigurable processing elements. More particularly, the present invention relates to a switch/network adapter port ("SNAP™") in a dual in-line memory module ("DIMM") or Rambus ("RIMM") format for a computing system employing multi-adaptive processing elements ("MAP®", both trademarks of SRC Computers, Inc.) for use with interleaved memory controllers in order to provide enhanced data transfer rates.

Among the most currently promising methods of creating large processor count, cost-effective computers involves the clustering together of a number of relatively low cost microprocessor based boards such as those commonly found in personal computers ("PCs"). These various boards are then operated using available clustering software to enable them to execute, in unison, to solve one or more large problems. During this problem solving process, intermediate computational results are often shared between processor boards.

Utilizing currently available technology, this sharing must pass over the peripheral component interconnect ("PCI") bus, which is the highest performance external interface bus, commonly found on today's PCs. While there are various versions of this bus available, all are limited to less than 1 GB/sec. bandwidth and, because of their location several levels of chips below the processor bus, they all exhibit a very high latency. In low cost PCs, this bus typically offers only on the order of 256 MB/sec. of bandwidth.

These factors, both individually and collectively can significantly limit the overall effectiveness of the cluster and, if a faster interface could be found, the ability of clusters to solve large problems would be greatly enhanced. Unfortunately, designing a new, dedicated chip set that could provide such a port is not only very expensive, it would also have to be customized for each type of clustering interconnect encountered. This would naturally lead to relatively low potential sale volumes for any one version of the chipset, thus rendering it cost ineffective.

With ever-increasing processor speeds, the need for high performance memory subsystems has also continued to increase. Since the development of the Switch/Network Adapter Port system as disclosed in the aforementioned U.S. patent application Ser. No. 09/932,330, the technology for high performance memory subsystems for the personal computer ("PC") market has come to include the use of interleaved memory.

In an interleaved memory system, two or more dual in-line memory module ("DIMM") slots are accessed by the memory controller at the same time. When a by-two interleaving scheme is used, the width of the data bus is effectively doubled, thus doubling the bandwidth that is obtained to memory. A similar configuration can be established to form a by-four, or four way, interleaved system using four DIMM slots. This form of memory controller is currently one of the more common high performance memories found in the higher end server systems and is rapidly becoming available in more mainstream products.

SUMMARY OF THE INVENTION

As disclosed in a representative embodiment herein, SRC Computers, Inc. proprietary SNAP™ technology has been enhanced such that the signals from two or more DIMM (or RIMM) slots are routed to a common control chip. Physically, in a by-two configuration, two DIMM form factor switch/network adapter boards may be coupled together using ridged flex circuit construction to form a single assembly. One of the DIMM boards may also be populated with a control field programmable gate array ("FPGA") which may have the signals from both DIMM slots routed to it. The control chip then samples the data off of both slots using the independent clocks of the slots. The data from both slots is then used to form a data packet that is then sent to other parts of the system. In a similar manner, the technique disclosed herein may be utilized in conjunction with more than two DIMM slots, for example, four DIMM slots is an four-way interleaved system.

In accordance with the present invention, an interleaved memory system uses two or more memory channels running in lock-step. A connection is made to one of the DIMM slots and the signals derived are used in conjunction with the original set of SNAP™ board signals. In operation, this effectively doubles (or more) the width of the data bus into and out of the memory. This technique can be implemented in conjunction with the proper selection of a memory and input/output ("I/O") controller ("North Bridge") chip that supports interleaved memory.

Particularly disclosed herein is a computer system comprising at least one processor, a controller for coupling the processor to a control block and a memory bus, a plurality of memory module slots coupled to the memory bus, an adapter port associated with a subset of the plurality of memory module slots and a processor element coupled to the adapter port. In a preferred embodiment, the adapter port may be conveniently provided in a DIMM or RIMM form factor.

Also disclosed herein is a computer system comprising at least one processor, an interleaved controller for coupling the processor to a control block and a memory bus, a plurality of memory slots coupled to the memory bus, an adapter port associated with at least two of the memory slots and a processor element coupled to each of the adapter ports.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
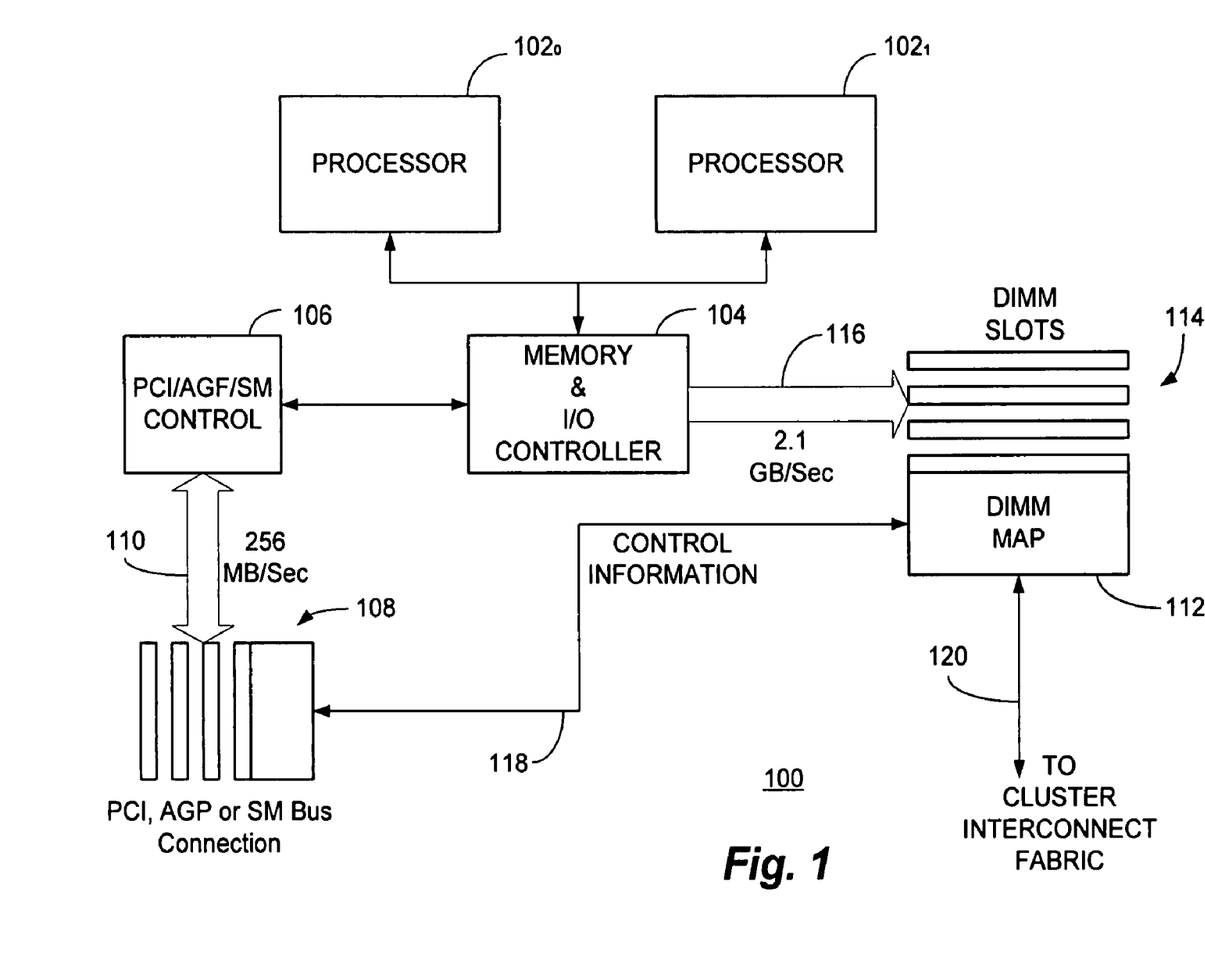
FIG. 1 is a functional block diagram of an exemplary embodiment of a switch/network adapter port for clustered computers employing a chain of multi-adaptive processors in a DIMM format to significantly enhance data transfer rates over that otherwise available from the peripheral component interconnect ("PCI") bus.

With reference now to FIG. 1, a functional block diagram of an exemplary embodiment of a computer system 100 is shown comprising a switch/network adapter port for clustered computers employing a chain of multi-adaptive processors in a DIMM format to significantly enhance data transfer rates over that otherwise available from the peripheral component interconnect ("PCI") bus.

In the particular embodiment illustrated, the computer system 100 includes one or more processors $102_0$ and $102_1$ which are coupled to an associated PC memory and I/O controller 104. In operation, the controller 104 sends and receives control information from a PCI control block 106. It should be noted that in alternative implementations of the present invention, the control block 106 may also be an accelerated graphics port ("AGP") or system maintenance ("SM") control block. The PCI control block 106 is coupled to one or more PCI card slots 108 by means of a relatively low bandwidth PCI bus 110 which allows data transfers at a rate of substantially 256 MB/sec. In the alternative embodiments of the present invention mentioned above, the card slots 108 may alternatively comprise accelerated graphics port ("AGP") or system maintenance ("SM") bus connections.

The controller 104 is also conventionally coupled to a number of DIMM slots 114 by means of a much higher bandwidth DIMM bus 116 capable of data transfer rates of substantially 2.1 GB/sec. or greater. In accordance with a particular implementation of the present invention, a DIMM MAP® element 112 is associated with, or physically located within, one of the DIMM slots 114. Control information to or from the DIMM MAP® element 112 is provided by means of a connection 118 interconnecting the PCI bus 110 and the DIMM MAP® element 112. The DIMM MAP® element 112 then may be coupled to another clustered computer MAP® element by means of a cluster interconnect fabric connection 120 connected to MAP® chain ports as will be more fully described hereinafter. It should be noted that, the DIMM MAP® element 12 may also comprise a Rambus DIMM ("RIMM") MAP® element.

Since the DIMM memory located within the DIMM slots 114 comprises the primary storage location for the PC microprocessor(s) $102_0$, $102_1$, it is designed to be electrically very "close" to the processor bus and thus exhibit very low latency. As noted previously, it is not uncommon for the latency associated with the DIMM to be on the order of only 25% of that of the PCI bus 110. By, in essence, harnessing this bandwidth as an interconnect between computer systems 100, greatly increased cluster performance may be realized.

To this end, by placing the DIMM MAP® element 112 in one of the PC's DIMM slots 114, its control chip (as will be more fully described hereinafter) could accept the normal memory "read" and "write" transactions and convert them to a format used by an interconnect switch or network. As will also be more fully described hereinafter, each MAP® element 112 includes chain ports to enable it to be coupled to other MAP® elements 112. Through the utilization of the chain port to connect to the external clustering fabric over connection 120, data packets can then be sent to remote nodes where they can be received by an identical board. In this particular application, the DIMM MAP® element 112 would extract the data from the packet and store it until needed by the receiving processor 102.

This technique results in the provision of data transfer rates several times higher than that of any currently available PC interface such as the PCI bus 110. However, the electrical protocol of the DIMMs is such that once the data arrives at the receiver, there is no way for a DIMM module within the DIMM slots 114 to signal the microprocessor 102 that it has arrived, and without this capability, the efforts of the processors 102 would have to be synchronized through the use of a continued polling of the DIMM MAP® elements 112 to determine if data has arrived. Such a technique would totally consume the microprocessor 102 and much of its bus bandwidth thus stalling all other bus agents.

To avoid this situation, the DIMM MAP® element 112 may be further provided with the connection 118 to allow it to communicate with the existing PCI bus 110 which could then generate communications packets and send them via the PCI bus 110 to the processor 102. Since these packets would account for but a very small percentage of the total data moved, the low bandwidth effects of the PCI bus 110 are minimized and conventional PCI interrupt signals could also be utilized to inform the processor 102 that data has arrived. In accordance with another implementation of the present invention, the system maintenance ("SM") bus (not shown) could also be used to signal the processor 102. The SM bus is a serial current mode bus that conventionally allows various devices on the processor board to interrupt the processor 102. In an alternative embodiment, the accelerated graphics port ("AGP") may also be utilized to signal the processor 102.

With a DIMM MAP® element 112 associated with what might be an entire DIMM slot 114, the PC will allocate a large block of addresses, typically on the order of 1 GB, for use by the DIMM MAP® element 112. While some of these can be decoded as commands, many can still be used as storage. By having at least as many address locations as the normal input/output ("I/O") block size used to transfer data from peripherals, the conventional Intel™ chip sets used in most PCs (including controller 104) will allow direct I/O transfers into the DIMM MAP® element 112. This then allows data to arrive from, for example, a disk and to pass directly into a DIMM MAP® element 112. It then may be altered in any fashion desired, packetized and transmitted to a remote node over connection 120. Because both the disk's PCI bus 110 and the DIMM MAP® element 112 and DIMM slots 114 are controlled by the PC memory controller 104, no processor bus bandwidth is consumed by this transfer.

It should also be noted that in certain PCs, several DIMMs within the DIMM slots 114 may be interleaved to provide wider memory access capability in order to increase memory bandwidth. In these systems, the previously described technique may also be utilized concurrently in several DIMM slots 114. Nevertheless, regardless of the particular implementation chosen, the end result is a DIMM-based MAP® element 112 having one or more connections to the PCI bus 110 and an external switch or network over connection 120 which results in many times the performance of a PCI-based connection alone as well as the ability to process data as it passes through the interconnect fabric.

Figure 2A:
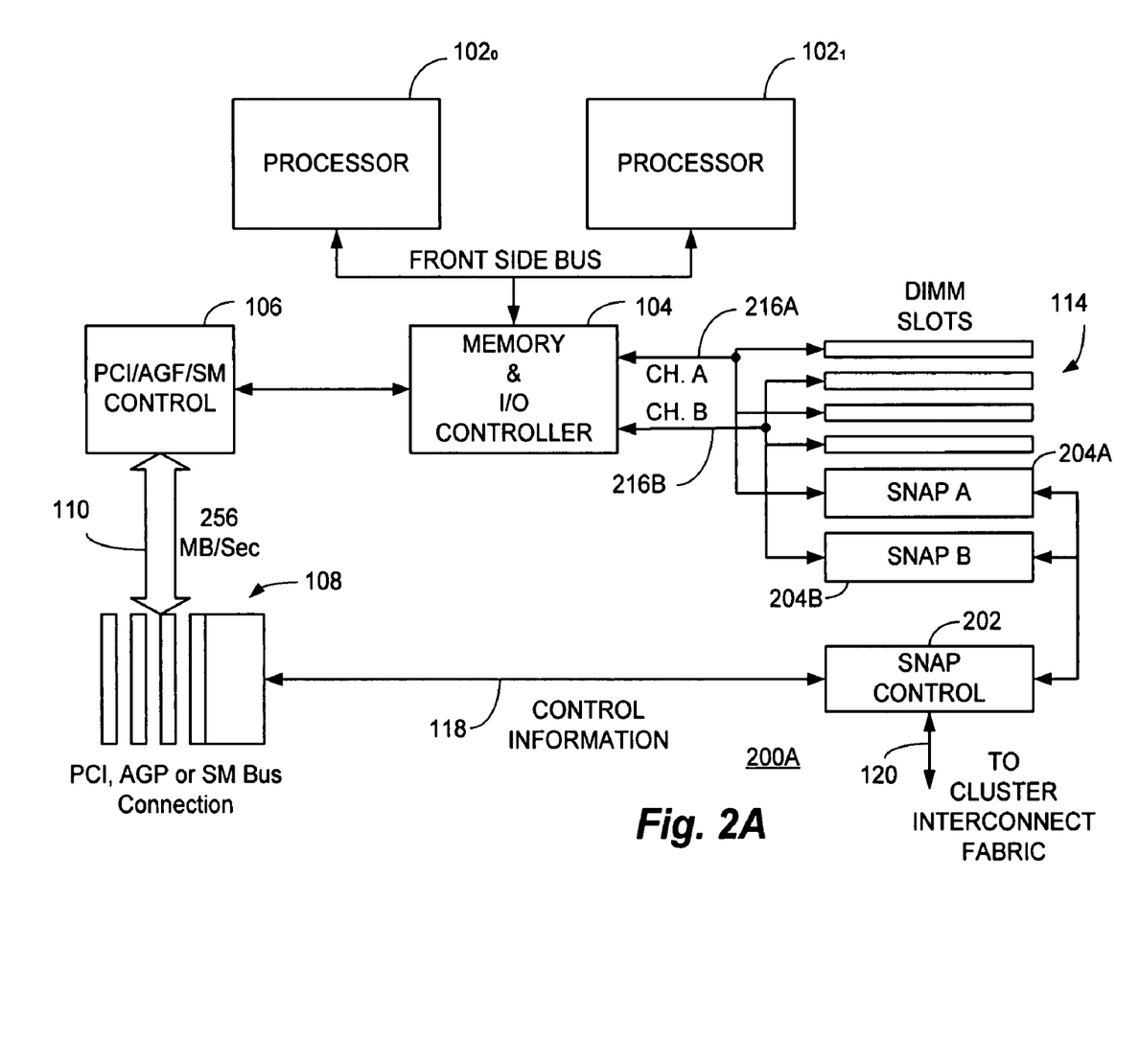
FIG. 2A is a functional block diagram of an exemplary embodiment of a switch/network adapter port in accordance with the present invention illustrating a by-two configuration of interleaved DIMM slot form factor SNAP elements coupled to a common control element.

With reference additionally now to FIG. 2A, a functional block diagram of an exemplary embodiment of a switch/network adapter port 200A in accordance with the present invention is shown. Like structure and functionality to that disclosed with respect to the foregoing figure is like numbered and the foregoing description thereof shall suffice herefor. The switch/network adapter port 200A is shown in a by-two configuration of interleaved DIMM slot form factor SNAP elements 204A and 204B coupled to a common control element 202. In this embodiment, the controller 104 is an interleaved memory controller bi-directionally coupled to the DIMM slots 114 and SNAP elements 204A, 204B by means of a Channel A 216A and a Channel B 216B.

Figure 2B:
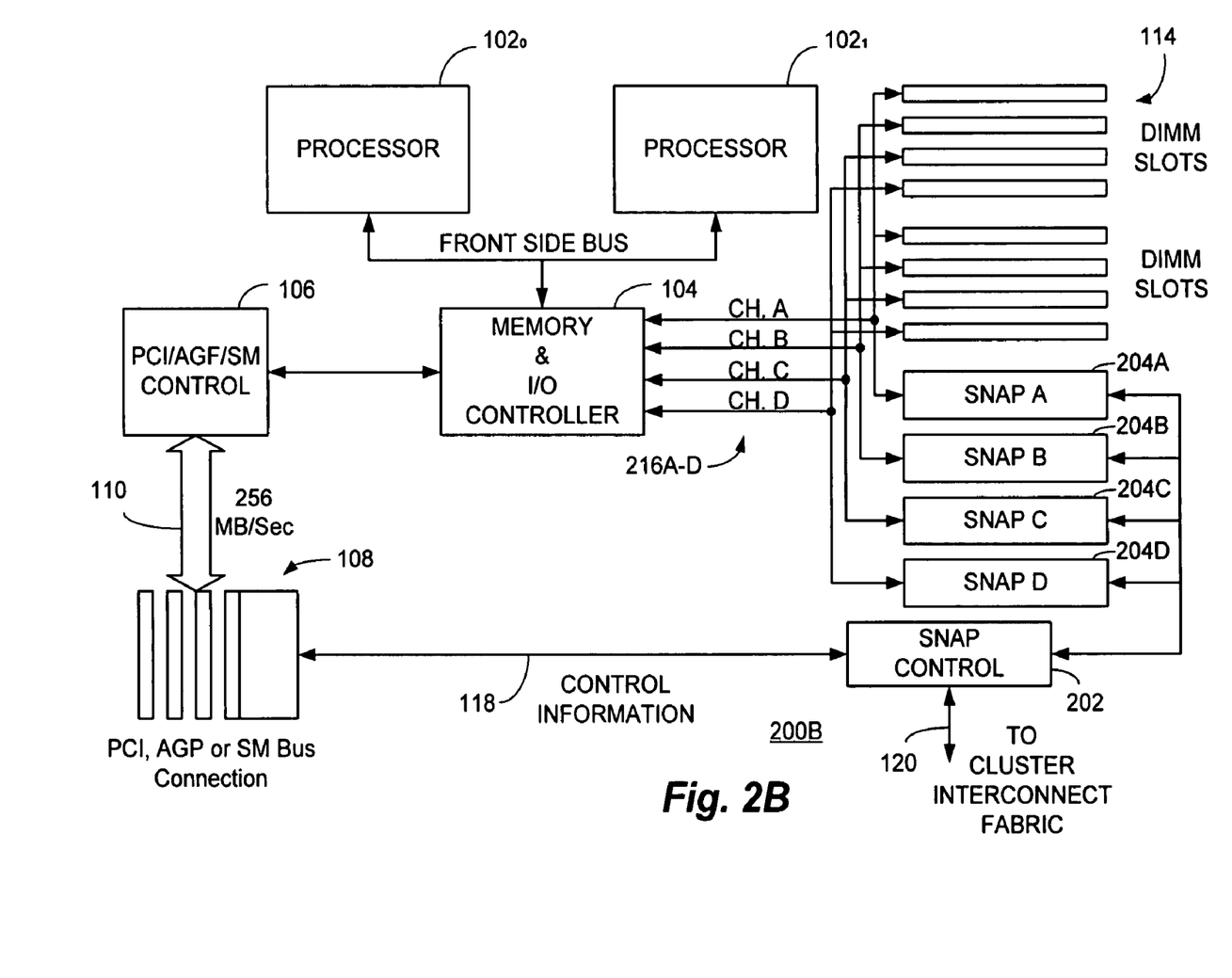
FIG. 2B is a further functional block diagram of another exemplary embodiment of a switch/network adapter port in accordance with the present invention illustrating a by-four configuration of interleaved DIMM slot form factor SNAP elements coupled to a common control element.

With reference additionally now to FIG. 2B, a functional block diagram of another exemplary embodiment of a switch/network adapter port 200B in accordance with the present invention is shown. Again, like structure and functionality to that disclosed with respect to the preceding figures is like numbered and the foregoing description thereof shall suffice herefor. The switch/network adapter port 200B is shown in a by-four configuration of interleaved DIMM slot form factor SNAP elements 204A through 204D coupled to a common control element 202. In this embodiment, the controller 104 is again an interleaved memory controller bi-directionally coupled to the DIMM slots 114 and SNAP elements 204A, 204B, 204C and 204D by means of respective Channel A 216A, Channel B 216B, Channel C 216C and Channel D 216D.

Figures 3, 4:
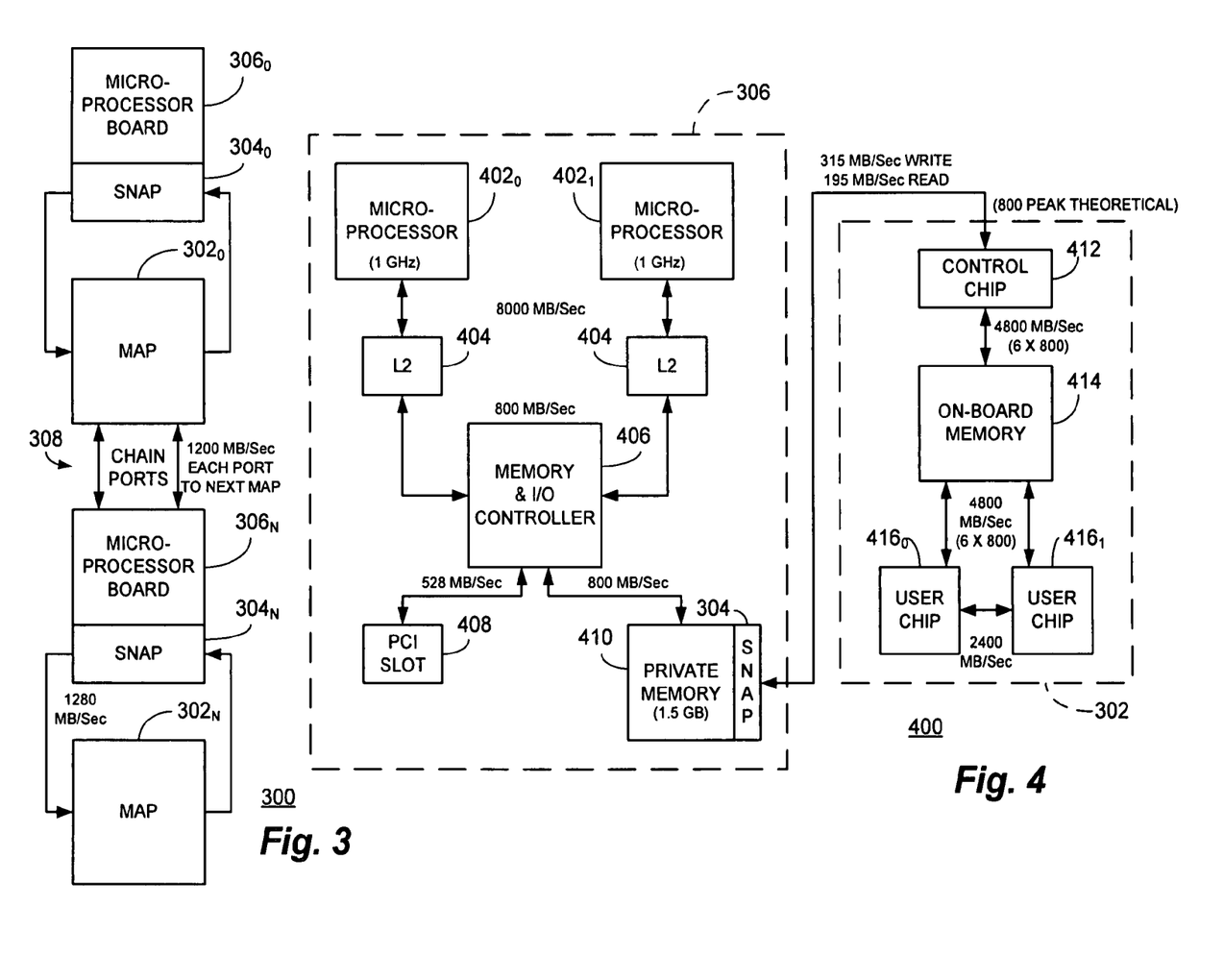
FIG. 3 is a high level functional block diagram of an SRC-6E computer system available from SRC Computers, Inc. which may incorporate the switch/network adapter port elements of the preceding figures and in which each processor board is coupled to its own MAP® element.
FIG. 4 is a more detailed functional block diagram of a portion of the SRC-6E computer system of the preceding figure illustrating one-half of a processor board in conjunction with one half of a MAP® board.

With reference additionally now to FIG. 3, a high level functional block diagram of an SRC-6E computer system 300 available from SRC Computers, Inc. is shown. The computer system 300 may incorporate the switch/network adapter port elements 204 of FIGS. 2A and 2B and comprises a number of MAP® elements $302_0$ through $302_N$, each coupled to a corresponding microprocessor board $306_0$ through $306_N$ by means of a respective switch/network adapter port $304_0$ through $304_N$. A number of chain ports 308 with a bandwidth of 1200 MB/Sec. or more, couple the various MAP® elements $302_0$ through $302_N$ to others of the MAP® elements $302_0$ through $302_N$. In operation, the computer system 300 provides equal MAP® element 302 to processor utilization with low data sharing, high MAP® element 302 input/output ("I/O") utilization and very low inter-processor communication.

With reference additionally now to FIG. 4, a more detailed functional block diagram of a portion of the SRC-6E computer system 300 of the preceding figure is shown as a computing system 400 and illustrating one-half of a processor board 306 in conjunction with one half of a MAP® board 302. As illustrated, the processor board 306 comprises a pair of microprocessors $402_0$ and $402_1$, each coupled to an associated level 2 ("L2") cache 404 and a memory and I/O controller (e.g. "North Bridge") 406. The controller 406 provides access to, for example, one or more peripheral component interconnect ("PCI") slots 408 and a private memory 410. The private memory 410 may comprise, for example, interleaved DIMM or RIMM slots having an associated switch/network adapter port 304 as will be more fully described hereinafter.

The MAP® element 302 includes a control block, or control chip 412 which is coupled to and controls the switch/network adapter port 304 in the processor board 306. The control chip 412, which may comprise a field programmable gate array ("FPGA"), is coupled to an on-board memory 414 which may comprise, for example, dual-ported static random access memory ("SRAM") or other types of memory devices. The on-board memory 414 is also coupled to one or more user chips (which may also be provided as FPGAs) $416_0$ and $416_1$.

Figure 5:
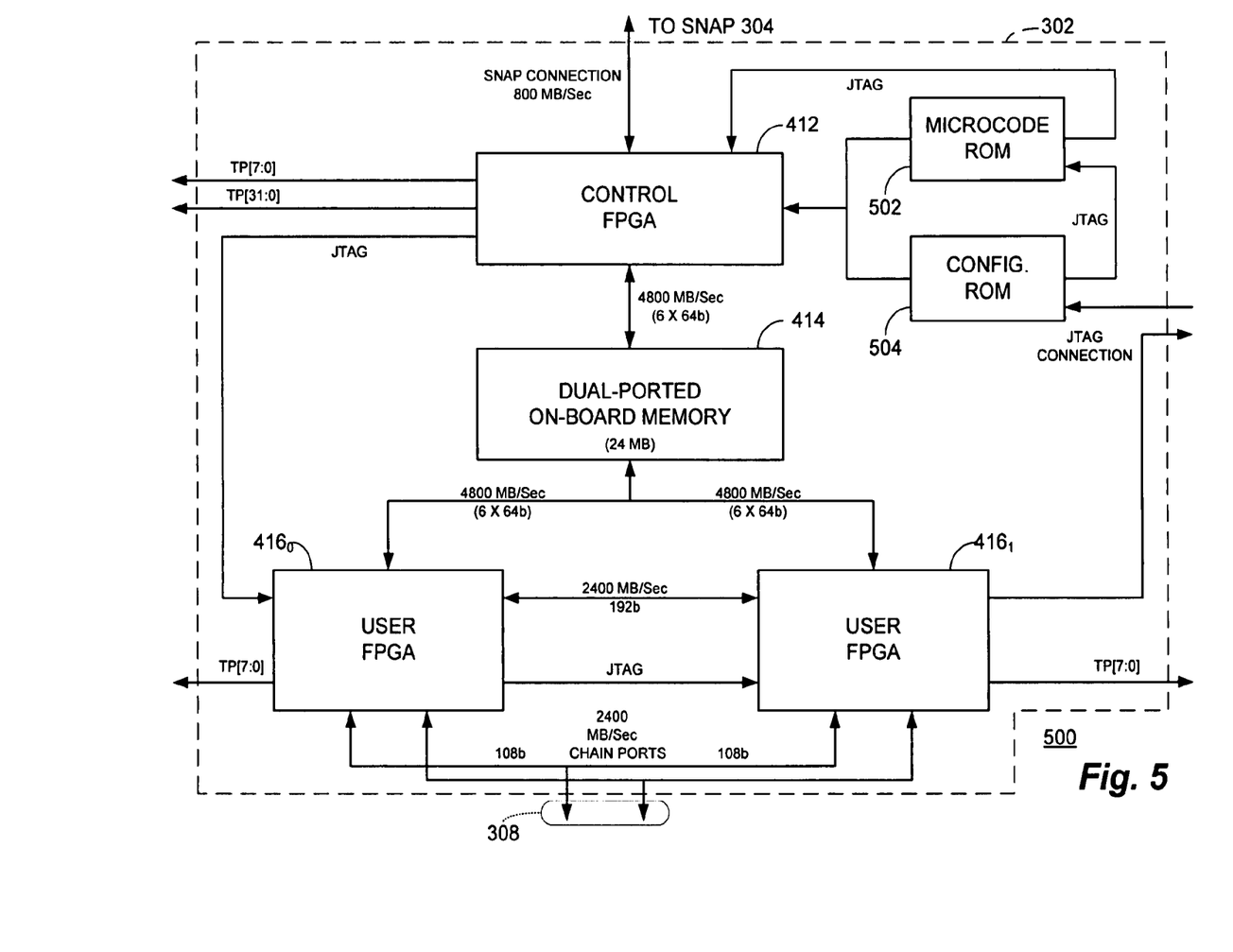
FIG. 5 is a further, more detailed functional block diagram of the MAP® element of the preceding figure illustrating the control FPGA, on-board memory and user FPGAs in particular.

With reference additionally now to FIG. 5, a further, more detailed functional block diagram of the MAP® element 302 of the preceding figure is shown In this view, a functional block 500 is illustrated showing in greater detail the control FPGA 412, on-board memory 414 and user FPGAs $416_0$ and $416_1$ and the bandwidths of the various connections therebetween. A microcode read only memory ("ROM") 502 and configuration ROM 504 for specifying the operation of the control FPGA 412 are also illustrated as well as a number of Joint Test Action Group ("JTAG") Institute of Electrical and Electronic Engineering (IEEE 1149.1) standard boundary scan connections. A number of chain ports 308 are shown for directly coupling various MAP® elements 302 in an overall computing system.

In a preferred embodiment, the control FPGA 412 may comprise a Virtex II XC2V6000 device available from Xilinx, Inc. containing six million gates implemented with a direct memory access ("DMA") function to control the user FPGAs 416. Similarly, the user FPGAs 416 may also comprise XC2V6000 devices implemented with a 100 MHz clock phase locked loop ("PLL") for multiple frequencies. The on-bard memory 414 may comprise six dual-ported memory banks of 24 Mbytes capable of operating at 100 MHz with 64 bit data paths.

Figure 6:
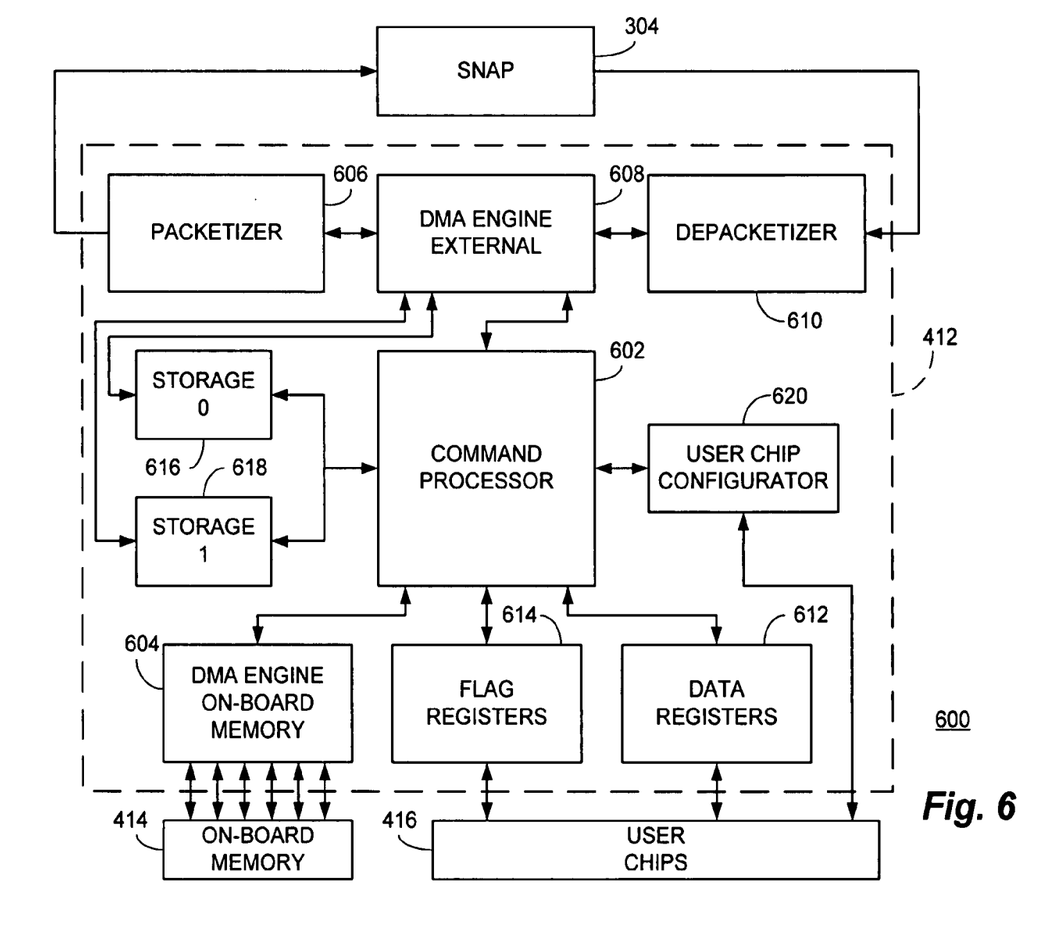
FIG. 6 is a further, more detailed functional block diagram of the control block, or chip, of the MAP® board illustrated in FIGS. 4 and 5.

With reference additionally now to FIG. 6 a further, more detailed functional block diagram of the control block 412 of the MAP® element 302 illustrated in FIGS. 4 and 5 is shown as a functional block 600. As depicted, the control block 412 is coupled to the switch/network adapter port 304 of the processor board 306 as well as to the on-board memory 414 and user chips 416.

The control block 412 includes a command processor 602 for processing a command list ("ComList") and issuing DMA requests. A DMA engine for on-board memory 604 is coupled to the command processor 602 and is used to address the six memory banks of the on-board memory 414 in linear strides and provides sixteen entry irregular access thereto. Another DMA engine for external accesses 608 is also coupled to the command processor 602 and performs DMA operations to memories outside of the MAP® element 302. It too has strided capability and maintains tracks of out-of-order responses.

The DMA engine 608 is coupled to a packetizer 606 which forms thirty two byte packets for transmission and generates error correction codes ("ECC") to ensure the validity of the data transmitted and received. A depacketizer 610 is also associated with the DMA engine 608 and functions to check data packet validity as well as to check and correct ECC data. A data register 612 and flag register 614 are coupled between the command processor 602 and the user chips 416. The former holds sixteen sets of data, with each set comprising thirty two 64 bit values while the latter holds thirty two 1 bit values.

The control block 412 also includes a number of storage locations which, in the exemplary embodiment illustrated, comprises storage 0 block 616 and storage 1 block 618 coupled between the command processor 602 and the DMA engine 608. The storage 0 block 616 is utilized to hold the first ComList as well as the first portion of the user configuration data for the control block 412. The storage 1 block 618 holds the second ComList as well as the second portion of the user configuration data. A user chip configurator 620 is coupled to the command processor 602 and the user chips 416 to control the user logic bitstream and to configure each of the user chips $416_0$ and $416_1$.

Figure 7:
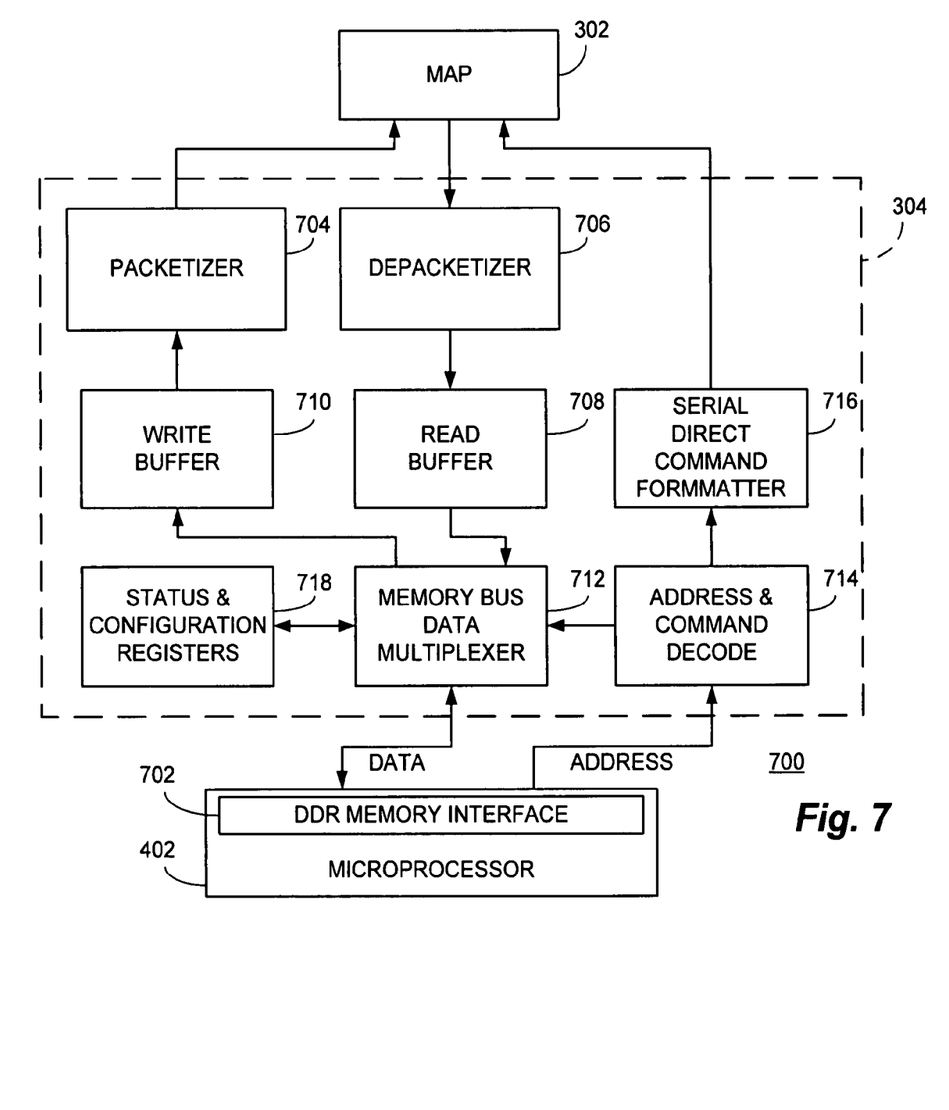
FIG. 7 is an additional, more detailed functional block diagram of a representative switch/network adapter port for use with the computer system illustrated in FIGS. 3 and 4.

With reference additionally now to FIG. 7, an additional, more detailed functional block diagram of a representative switch/network adapter port 304 is shown as a functional block 700 for possible use with the computer system illustrated in FIGS. 3 and 4. The switch/network adapter port 304 may conveniently be provided in a form factor to plug into a DIMM or RIMM slot of a microprocessor board 306 (FIG. 3) and provides for the interconnection of a MAP® element 302 to one or more microprocessors 402, e.g. microprocessors 102 of FIGS. 1, 2A and 2B. In this regard, the switch/network adapter port 304 may be coupled to exchange data and address information with, for example, a double data rate ("DDR") memory interface 702 to the one or more microprocessors 402.

The switch/network adapter port 304 comprises a packetizer 704 which is coupled to the MAP® element 302 to provide DMA header packet reply and retry functionality as well as ECC checkbyte generation. A depacketizer 706 is also coupled to the MAP® element 302 and performs a DMA header packet sort, data request packet sort and ECC check and correct function on data received by the switch/network adapter port 304. A read buffer 708 is coupled to the depacketizer 706 and is provided with, in the exemplary embodiment illustrated, 32 Kbytes or more capacity for holding 1024 cache lines of "read" data. A corresponding write buffer 710 is coupled to the packetizer 704 and may also have a capacity of 32 Kbytes or more for holding 1024 cache lines of "write" data.

A memory bus data multiplexer 712 is coupled between the data bus of the DDR memory interface 702 and the read and write buffers 708, 710. The memory bus data multiplexer 712 functions as a data multiplexer between these elements while an address and command decode block 714 is coupled between the address bus of the DDR memory interface 702 and the multiplexer 712 to control data read/write functions of the memory bus data multiplexer 712, the information to be maintained in status and configuration registers 718 and to send direct commands to the MAP® element 302. In this regard, a serial direct command formatter 716 is coupled to the address and command decode block 714 to provide MAP® element 302 direct command support.

Figure 8:
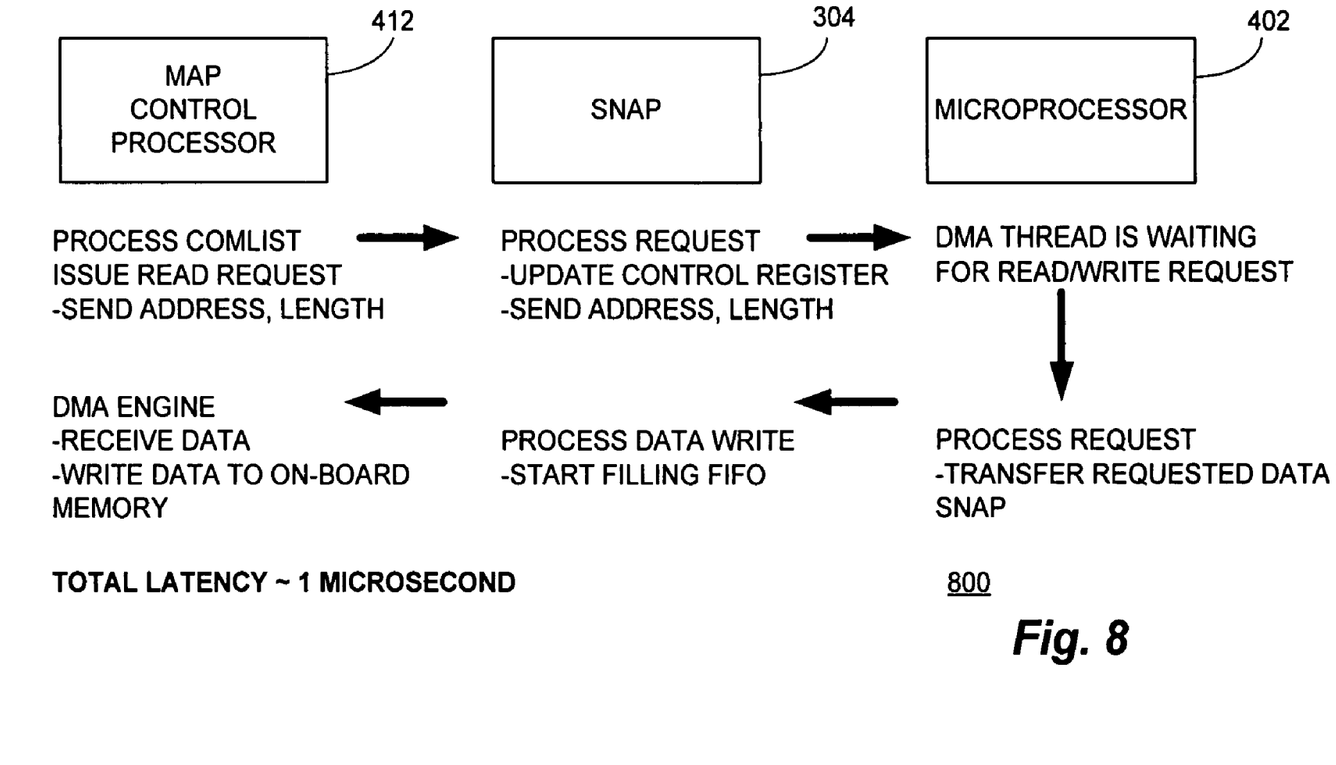
FIG. 8 is an illustration showing the interaction between the MAP® control block, switch/network adapter port and microprocessor in the operation of a computer system utilizing a switch/network adapter port in accordance with the present invention.

With reference additionally now to FIG. 8, an illustration showing the interaction between the MAP® control block 412, switch/network adapter port 304 and one or more microprocessors 402 (e.g., of FIG. 4) is provided as an example of the operation of a computer system utilizing a switch/network adapter port in accordance with the present invention.

In this representative "read" operation, the MAP® control block 412 first processes the ComList and issues a "read" request which includes the address and length of the data requested. This request is forwarded to the associated switch/network adapter port 304 where it is processed. The switch/network adapter port 304 updates its control registers and sends the address and length of the data requested on to a microprocessor 402. The microprocessor 402 has a DMA thread waiting for either a "read" or "write" request. It then processes the data request and transfers the requested data to the requesting switch/network adapter port 304. The switch/network adapter port 304 processes a data write of the received data and starts filling a first-in, first-out register for transfer of the data to the MAP® control block 412. The DMA engine 608 (FIG. 6) of the MAP® control block 412 receives the data and the data is written to the on-board memory 414 by the DMA engine 604. In the exemplary embodiment illustrated, the total latency for this entire operation is on the order of 1.0 nanoseconds from the time the MAP® control block 412 issued the request until the first stream of data is received.

Figure 9:
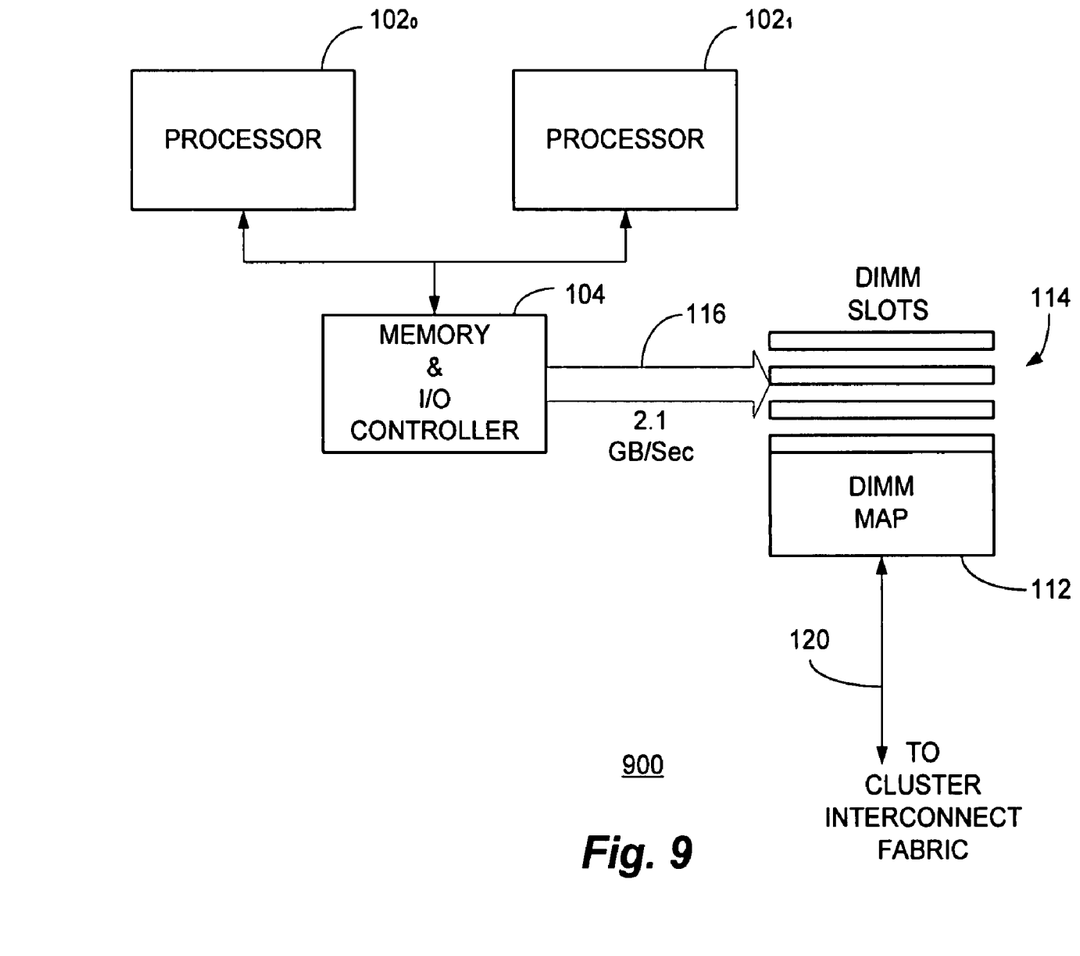
FIG. 9 is a functional block diagram of an exemplary embodiment of a switch/network adapter port for clustered computers employing a chain of multi-adaptive processors in a DIMM format to significantly enhance data transfer rates over that otherwise available from the peripheral component interconnect ("PCI") bus corresponding to FIG. 1, but wherein the low-speed bus path has been removed and the equivalent functionality provided by the remaining system components and by polling of memory mapped registers in a processor.
Figure 10A:
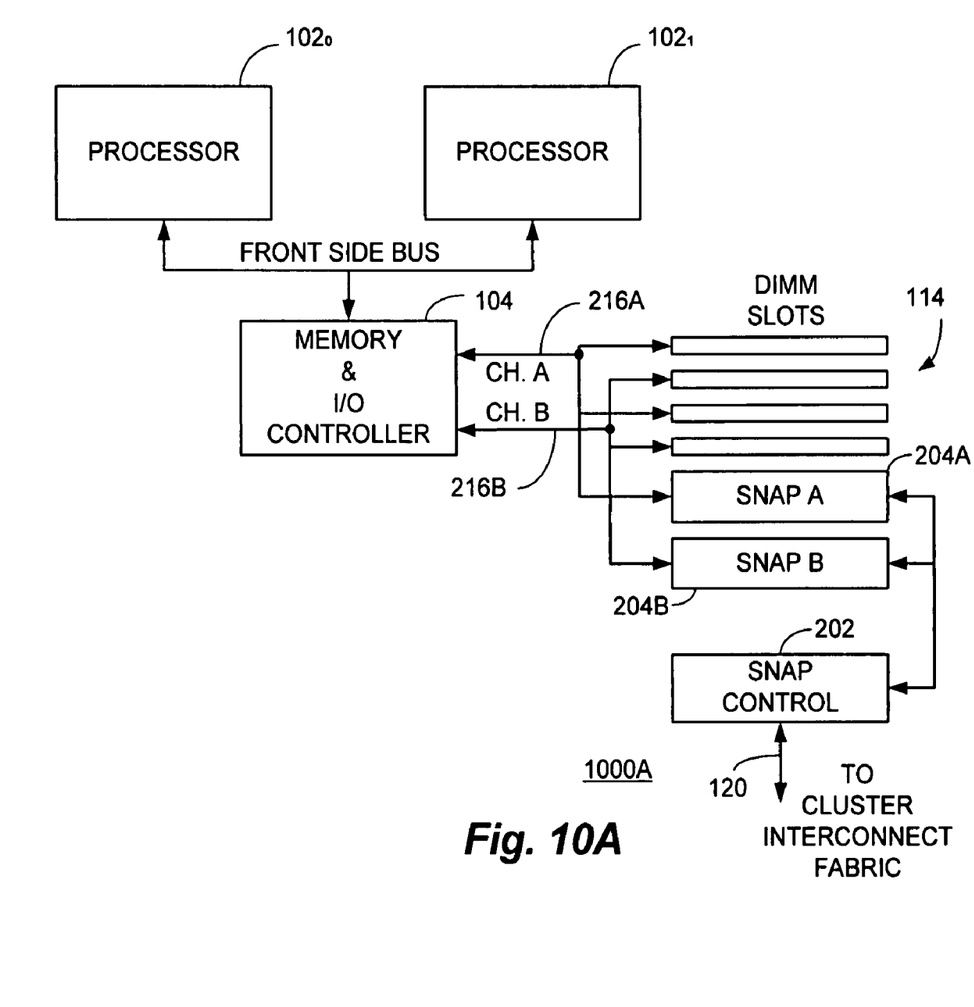
FIG. 10A is a functional block diagram of an exemplary embodiment of a switch/network adapter port in accordance with the present invention illustrating a by-two configuration of interleaved DIMM slot form factor SNAP elements coupled to a common control element according to FIG. 2A, but wherein the low-speed bus path has been removed and the equivalent functionality provided by the remaining system components and by polling of memory mapped registers in a processor.
Figure 10B:
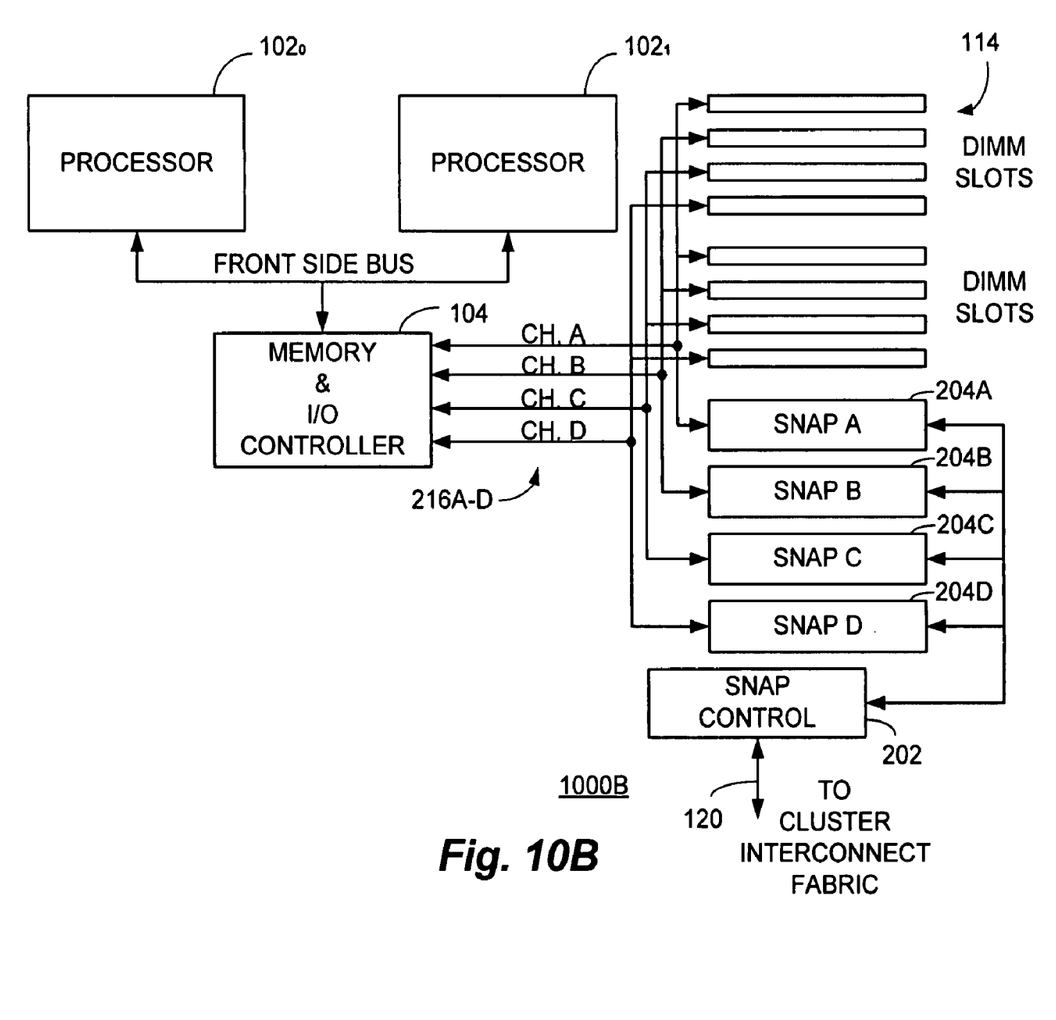
FIG. 10B is a further functional block diagram of another exemplary embodiment of a switch/network adapter port in accordance with the present invention illustrating a by-four configuration of interleaved DIMM slot form factor SNAP elements coupled to a common control element according to FIG. 2B, but wherein the low-speed bus path has been removed and the equivalent functionality provided by the remaining system components and by polling of memory mapped registers in a processor.

Referring generally now to FIGS. 9, 10A, and 10B, respective embodiments 900, 1000A, and 1000B of the present invention are described in which previous elements 106, 108, 110, and 118 in corresponding FIGS. 1, 2A, and 2B are completely removed. The functionality of the remaining elements is the same as in corresponding FIGS. 1, 2A, and 2B, except as is further described and clarified below.

In operation, the DIMM MAP 112 and the processors 102 communicate through the use of a series of memory mapped registers. These registers are mapped into the address space of the processor 102 when the SNAP software driver is loaded. The SNAP does not have a direct means of interrupting the processor 102, as is the case with the previously described low speed interface. This direct communication between the processor 102 and the SNAP provided a way for the SNAP to signal the processor that a new DMA request had been received. The processor 102, in response to this signal, would begin a DMA transfer of data either to the SNAP or would receive data from the SNAP. However, since the computer systems 900, 1000A and 1000B are dual processor systems, the second of the two processors is typically idle while the SNAP driver is running. The software driver used to provide the communication between the processors and the SNAP is a multi-threaded driver. A second thread in the driver can be used to constantly poll the memory mapped register in the SNAP, looking for the receipt of a DMA request without any loss in system performance. In practical use of the computer system of the present invention it has been determined that polling of the critical registers by the processor 102 provides for a more responsive system with lower latency DMA transfers.

While there have been described above the principles of the present invention in conjunction with specific system implementations and technologies, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer system comprising:
at least one processor including memory mapped registers mapped into the address space of the at least one processor;
a controller for coupling said at least one processor to a control block and a memory bus;
a plurality of memory module slots coupled to said memory bus;
an adapter port associated with a subset of said plurality of memory module slots forming a data path between the adapter port and the memory bus wherein the data path is capable of communicating data at memory bus speeds; and
a processor element including memory mapped registers mapped into the address space of the processor element coupled to said adapter port,
wherein polling of the memory mapped registers mapped into the address space of the processor element by the at least one processor provides a direct low latency communication link via the memory bus and the controller between the processor and the processor element for communicating DMA requests wherein the direct low latency communication link is capable of communicating at memory bus speeds.

2. The computer system of claim 1 wherein said controller comprises an interleaved memory controller.

3. The computer system of claim 1 wherein said plurality of memory module slots comprise DIMM memory module slots.

4. The computer system of claim 3 wherein said adapter port comprises a DIMM physical format for retention within one of said DIMM memory module slots.

5. The computer system of claim 1 wherein said plurality of memory module slots comprise in-line memory module serial interface memory module slots.

6. The computer system of claim 5 wherein said adapter port comprises a in-line memory module serial interface physical format for retention within one of said in-line memory module serial interface memory module slots.

7. The computer system of claim 1 wherein said control block provides control information to said adapter port.

8. The computer system of claim 1 wherein said adapter port comprises:
a memory bus data multiplexer adapted to receive data information from said memory bus.

9. The computer system of claim 8 wherein said adapter port further comprises:
an address and command decoder adapted to receive address information from said memory bus.

10. The computer system of claim 9 further comprising:
a command formatter coupling said address and command decoder to said processor element.

11. The computer system of claim 8 wherein said adapter port further comprises:
a write buffer for coupling said data information received from said memory bus to said processor element; and
a read buffer for coupling data provided by said processor element to said memory bus.

12. The computer system of claim 11 further comprising:
a packetizer for coupling said write buffer to said processor element; and
a depacketizer for coupling said processor element to said read buffer.

13. The computer system of claim 8 further comprising:
a plurality of registers coupled to said memory bus data multiplexer.

14. The computer system of claim 13 wherein said plurality of registers comprise configuration registers.

15. The computer system of claim 13 wherein said plurality of registers comprise status registers.

16. The computer system of claim 1 wherein said processor element comprises a reconfigurable processor element.

17. The computer system of claim 1 wherein said processor element is operative to alter data received from said controller on said memory bus.

18. The computer system of claim 1 wherein said processor element is operative to alter data received from an external source prior to placing altered data on said memory bus.

19. The computer system of claim 1 wherein said processor element comprises:
a processor element control block coupled to said adapter port.

20. The computer system of claim 19 wherein said processor element further comprises:
at least one field programmable gate array configurable to perform an identified algorithm on and operand provided thereto by said adapter port.

21. The computer system of claim 20 further comprising:
a dual-ported memory block coupling the processor element control block coupled to said adapter port to said at least one field programmable gate array.

22. The computer system of claim 1 wherein said processor element comprises:
a chain port for coupling said processor element to another processor element.

23. The computer system of claim 19 wherein said processor element further comprises:
a read only memory associated with said control block for providing configuration information thereto.

24. A method of operating a computer system comprising:
providing at least one processor including memory mapped registers mapped into the address space of the at least one processor;
coupling said at least one processor to a control block and a memory bus;
providing a plurality of memory module slots coupled to said memory bus;
providing an adapter port associated with a subset of said plurality of memory module slots forming a data path between the adapter port and the memory bus wherein the data path is capable of communicating data at memory bus speeds;
providing a processor element including memory mapped registers mapped into the address space of the processor element coupled to said adapter port; and
polling the memory mapped registers mapped into the address space of the processor element by the at least one processor to provide a direct low latency communication link via the memory bus and the controller between the processor and the processor element for communicating DMA requests wherein the direct low latency communication link is capable of communicating at memory bus speeds.

* * * * *